United States Patent
Wu et al.

(10) Patent No.: US 7,864,879 B2
(45) Date of Patent: Jan. 4, 2011

(54) SYSTEM HAVING A SIGNAL PROCESSOR FOR DETECTION OF A SIGNAL TYPE

(75) Inventors: Xiaofeng Wu, Neubiberg (DE); Martin Krueger, Munich (DE)

(73) Assignee: Infineon Technologies AG, Neubiberg (DE)

( * ) Notice: Subject to any disclaimer, the term of this patent is extended or adjusted under 35 U.S.C. 154(b) by 994 days.

(21) Appl. No.: 11/675,393

(22) Filed: Feb. 15, 2007

(65) Prior Publication Data

US 2007/0217550 A1 Sep. 20, 2007

(30) Foreign Application Priority Data

Feb. 15, 2006 (DE) .................. 10 2006 007 025

(51) Int. Cl.
*H04B 15/00* (2006.01)
(52) U.S. Cl. .................. 375/285; 375/130; 375/278; 375/284; 375/346; 329/318; 329/320; 329/349; 329/353; 455/501; 455/63.1; 455/67.13; 455/296; 455/283
(58) Field of Classification Search .................. 375/130, 375/144, 148, 346, 278, 284, 285; 329/318, 329/320, 349, 353; 455/501, 63.1, 67.13, 455/283, 296
See application file for complete search history.

(56) References Cited

U.S. PATENT DOCUMENTS

2001/0050967 A1   12/2001   Kuzminskiy et al.
2003/0231721 A1*  12/2003   Rouphael et al. ............ 375/341
2004/0233886 A1*  11/2004   Dieterich et al. ............ 370/348

FOREIGN PATENT DOCUMENTS

| DE | 10152628 | 5/2003 |
|---|---|---|
| DE | 10253671 | 8/2004 |
| EP | 0547373 | 6/1993 |
| EP | 1158684 | 11/2001 |
| WO | 02067444 | 8/2002 |

OTHER PUBLICATIONS

"Digital Communications", John G. Proakis, McGraw-Hill, Inc., Sep. 30, 2003.
"Equalization Concepts for EDGE", Wolfgang H. Gerstacker, IEEE Transactions on Wireless Communications, vol. 1, No. 1, Jan. 2002.
"Feasibility of Linear GSM Blind Channel Equalization", Zhi Ding, et al., IEEE, 1998.

* cited by examiner

*Primary Examiner*—Mohammad H Ghayour
*Assistant Examiner*—Leila Malek
(74) *Attorney, Agent, or Firm*—Dicke, Billig & Czaja, PLLC

(57) ABSTRACT

A system having a signal processor for detection of a signal type of a signal is disclosed. One embodiment includes a processor designed to determine a first variable which is characteristic of a first spectrum element of the signal spectrum, and to determine a second variable which is characteristic of a second spectrum element of the signal spectrum. A system is provided for determination of a ratio between the first variable and the second variable, and a detector which is designed to detect the signal type on the basis of the ratio.

11 Claims, 5 Drawing Sheets

SYSTEM HAVING A SIGNAL PROCESSOR FOR DETECTION OF A SIGNAL TYPE

CROSS-REFERENCE TO RELATED APPLICATIONS

This Utility Patent Application claims priority to German Patent Application No. DE 10 2006 007 25.9 filed on Feb. 15, 2006, which is incorporated herein by reference.

BACKGROUND

The present invention relates to digital signal processing and in particular to signal detection.

When data packets are being transmitted over a mobile radio channel, multipath propagation occurs, and causes intersymbol interference with the signal. The intersymbol interference is normally corrected by a combination of a linear equalizer and a Viterbi algorithm (see "Equalization Concepts for EDGE" by W. H. Gerstacker, R. Schober, IEEE Trans. Wireless Comm., pages 190-199, January 2002, and US 2001/0050967 A1).

In addition to the intersymbol interference, the received signal generally also has superimposed on it various other types of interference, such as noise, co-channel interference and adjacent-channel interference. While the interference in the case of co-channel interference is in the same frequency band as the useful signal, and, for example, is caused by a subscriber who is active in another cell in the network, the interference in the case of adjacent-channel interference occurs in one of the two adjacent frequency bands.

Adjacent-channel interference is influenced by the channel bandwidth and the symbol frequency used in the system. A narrow channel bandwidth and a high symbol frequency are desirable in order to achieve a high system subscriber capacity and a high data rate. On the other hand, this results in an increase in the adjacent-channel interference, which must not exceed a specific limit.

In many mobile communication systems, such as GSM (Global System for Mobile Communication) and its further development EDGE (Enhanced Data Services for GSM Evolution) the overall transmission bandwidth is subdivided into a large number of narrowband frequency bands (traffic channels). For GSM and EDGE, the symbol frequency is 270.833 kHz, and the channel bandwidth is 200 kHz. This means that the useful signal and the adjacent-channel interference spectrally overlap one another. It is impossible to completely suppress the adjacent-channel interference without constricting the spectrum of the useful signal.

DE 101 52 628 A1 ("Adaptives Kanalfilter für Mobilfunkempfänger und Verfahren zur adaptiven Filterung" [Adaptive channel filter for mobile radio receivers, and method for adaptive filtering] by X. Wu, B. Yang) and DE 102 53 671 ("Unterdrückung der Nachbarkanalinterferenz durch Kanalfilterung in Mobilfunkempfängern" [Suppression of the adjacent-channel interference by channel filtering in mobile radio receivers] by X. Wu, B. Gunzelmann) have proposed a method which adjusts the pass bandwidth of the channel filter as a function of the strength of the adjacent-channel interference. This results in an adaptive channel filter which allows optimum filtering of the received signal, in terms of the suppression of adjacent-channel interference, in different reception and/or interference situations. However, an adaptive filter such as this is not often the optimum solution for every interference situation. An optimum solution is achieved only when the optimum algorithm for interference reduction can be used for each interference type. However, this is dependent on reliable identification of the interference types.

In order to identify the interference, the channel coefficients are first of all estimated from the received signal using a known symbol sequence (training sequence). The following channel model is used for channel estimation:

$$x(k) = \sum_{i=0}^{L} h(i) \cdot t(k-i) + n(k) \quad (1)$$

In this case, $(t(0) \ldots t(N-1))$ is the training sequence with the length N, L is the order of the channel and $(h(0) \ldots h(L))$ are the channel coefficients to be estimated. $n(k)$ represents the noise plus interference and $x(k)$ is the received signal.

The received signal $x(k)$ is normally composed of a superimposition of the useful signal S, the noise N and the interference I. The signal S can be reconstructed from the estimated channel coefficients and the known training sequence. The difference between $x(k)$ and the reconstructed signal results in an error signal $e(k)$ which predominantly contains only noise and interference. The energy in the reconstructed signal $P_S$ and of the error signal $P_N+P_I$ can be calculated from the sum of the squares of the magnitudes of the respective signal.

Since the mean energy of the noise $P_N$ is a receiver parameter and generally remains constant, while the interference energy changes from one burst to the next, it is possible to determine the noise energy $P_N$ and the interference $P_I$ from knowledge of the noise level in the receiver. The estimated signal-to-noise ratio $SNR=P_S/P_N$ and the estimated signal-to-interference ratio $SIR=P_S/P_I$ are used as measures for the identification of the interference. Interference is detected when the SNR-SIR exceeds a predefined threshold.

One disadvantage of this method is that it detects only the interference but does not distinguish between co-channel interference and adjacent-channel interference, and therefore does not make it possible to choose optimum interference reduction for the respective interference situation. Furthermore, the detection process is relatively susceptible to errors as a result of the short training sequence duration (for example 26 symbols) and the resultant inaccurate estimation of the energy.

The method proposed in WO 02/067444 A1 ("Apparatus for and method of reducing interference in a communications receiver" by A. Kleinermann et al.) likewise identifies the interference from the error signal which is derived from the channel estimation. The autocorrelation vector or the power density spectrum of the error signal is used as a measure. The autocorrelation vector of the error signal can be calculated as follows:

$$r_{ee}(n) = \sum_{k=0}^{N-L} e(k) \cdot e(k+n-N+L) \quad (2)$$

$$(n = 0, 1, \ldots 2(N-L))$$

The power density spectrum of the error signal can be calculated by Fourier transformation of the autocorrelation vector:

$$R_{ee}(k) = \sum_{n=0}^{2(N-L)} r_{ee}(n) \cdot e^{\frac{-j2\pi kn}{2(N-L)+1}} \quad (3)$$

$$(k = 0, 1, \ldots 2(N-L))$$

First of all, a large amount of received data relating to different channel types and interference types is recorded off-line. The corresponding power density spectra or autocorrelation vectors of the error signal are calculated off-line for each channel type and interference type, are averaged over a long time, and are then stored as references in the memory (RAM or ROM). During operation, the power density spectrum and/or the autocorrelation vector of the current burst are/is calculated on-line, and are/is compared with the references.

The first variant, which is illustrated in FIG. 4, uses the power density spectrum as the detection feature. In this case, a matched filter bank with N filters (N is the number of different interference references) is required. The matched filter with the maximum output is then taken, and the corresponding interference reference is chosen as the current interference type.

The second variant, which is illustrated in FIG. 5, uses the autocorrelation vector of the error signal for detection. The interference reference whose autocorrelation vector is closest to the current autocorrelation vector is taken as the current interference type.

The greater the number of different channel types and interference types used, the greater is the implementation complexity. Since the feature (power density spectrum or autocorrelation vector) of the current error signal can vary to a relatively major extent from one burst to the next as a result of multipower propagation, direct feature comparison of the current burst with the references does not always lead to a correct association.

For these and other reasons, there is a need for the present invention.

SUMMARY

One embodiment provides a system having a signal processor for detection of a signal type that has a signal-type-dependent signal spectrum. A processor configured to determine a first variable which is characteristic of a first spectrum element of the signal spectrum, and to determine a second variable which is characteristic of a second spectrum element of the signal spectrum. A system is provided, configured to determine a ratio between the first variable and the second variable and a detector which is designed to detect the signal type on the basis of the ratio.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

Figure 1A:
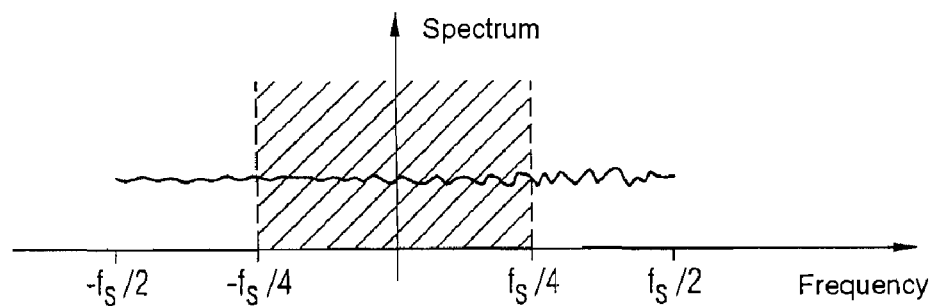
FIG. 1A illustrates a profile of an interference-free signal spectrum.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

One or more embodiments provide having a signal processor for detection of signal types, by which signal types can also be detected and identified with less complexity.

According to embodiments of the invention, different signals which are associated with different signal types have different spectral characteristics, for example a different energy distribution within the signal bandwidth. If a signal spectrum is subdivided into a plurality of spectrum elements, then, for example, the energy levels in the spectrum elements can be related to one another as a ratio. The signal type can be deduced on the basis of the ratio. The signal types may, for example, indicate co-channel interference, interchannel interference, or noise.

One embodiment provides a system or apparatus for detection of a signal type of a signal which has a signal-type-dependent signal spectrum. The apparatus has a processor which is designed to determine a first variable which is characteristic of a first spectrum element of the signal spectrum, and to determine a second variable which is characteristic of a second spectrum element of the signal spectrum.

The first spectrum element may be a section from the signal spectrum. The first spectrum element includes at least one frequency which also covers the signal spectrum of the signal. This also applies to the second spectrum element. Both the first spectrum element and the second spectrum element are arranged within the signal spectrum and do not overlap, and/or have spectral ranges which do not overlap. The first and the second spectrum elements may cover one or more frequencies.

According to one embodiment, the first variable may be the energy in the first spectrum element, and the second variable may be the energy in the second spectrum element. According to another embodiment, the first variable may be the spectral power density of the first spectrum element, and the second variable may be the spectral power density of the second spectrum element. Furthermore, the first variable may be the magnitude of the signal spectrum at a first frequency, which is represented by the first spectrum element, and the second variable may be the magnitude of the signal spectrum at a second frequency, which is governed by the second spectrum element.

According to one or more embodiments of the invention, the apparatus for detection of the signal type has a system or means for determination of the ratio between the first variable and the second variable. The means for determination of the ratio may, for example, have a divider which is designed to divide the first variable by the second variable or to divide the second variable by the first variable, in order to determine the ratio.

The apparatus according to the invention also has a detector which is designed to detect the signal type on the basis of the ratio. The detector may, for example, be designed to detect the signal type on the basis of a comparison of the ratio of the first and of the second variable with a threshold value. For example, the detector may be designed to detect a first signal type from a plurality of possible signal types when the ratio is greater than the threshold value, and to detect a second signal type when the ratio is less than the threshold value. The detector can also be designed to detect the second signal type of the plurality of signal types when the ratio is less than a further threshold value, with the further threshold value being lower than the threshold value.

According to one embodiment, the processor is designed to first of all determine an autocorrelation of the signal for determination of the first and of the second variable, and to transfer the autocorrelation of the signal to the spectral domain by Fourier transformation. The processor can also be designed to select the first and the second spectrum element from the Fourier transforms of the autocorrelation of the signal, and to determine the first and the second variable within the respective spectrum element on the basis of the values of the Fourier transforms of the autocorrelation of the signal. For example, the processor may be designed to square the magnitudes of the values of the Fourier transforms of the autocorrelation of the signal, and to add them up within the respective spectrum element.

According to another embodiment, the processor is designed to transfer the signal by Fourier transformation to a Fourier transform, in order to obtain a spectral representation of the signal. The processor determines the first variable and the second variable on the basis of the Fourier transforms. For example, the processor is designed to select the first and the second spectrum element, and to determine the energies of the spectrum elements in the frequency domain.

According to another embodiment, the processor is designed to determine the first variable and to determine the second variable by filtering in the time domain. The processor is designed to filter the signal in order to obtain a first signal component which has the first spectrum element. By way of example, the filter can be carried out by a 1/N-band filter, such that the bandwidth of the first spectrum element is 1/N-th of the bandwidth of the signal. In order to obtain a second signal component, which has the second spectrum element, the processor is, according to one exemplary embodiment, designed to subtract the first signal component, that is to say the filtered signal, from the signal in order to obtain the second signal component. According to another embodiment, the processor can likewise produce the second signal component by filtering using a filter, for example a 1/N-band filter, with the pass band of the filter for obtaining the first signal component and the pass band of the filter for obtaining the second signal component being different. The filter bandwidths may be the same or different.

According to one exemplary embodiment, the processor is designed to filter the signal using a half-band filter (N=2) in order to obtain the first signal component. The bandwidth of the first spectrum element and its arrangement in the frequency domain are thus governed by the pass band of the half-band filter and its mid-frequency. The second signal component can be produced either by the subtraction process as described above or by a further half-band filter.

The signal may be an interference signal or an error signal which is contained, in addition to a useful signal, in a received signal. In this case, the signal type detected by the apparatus according to the invention indicates an interference type (error signal type), for example co-channel interference, adjacent-channel interference or noise. The apparatus according to the invention may, according to one embodiment, be connected downstream from a processing unit which is designed to determine an error signal such as this on the basis of the received signal, the training sequences and the channel impulse response.

According to a further embodiment, the apparatus according to the invention is designed to produce an error signal such as this and to detect its signal type (that is to say the interference type). For this purpose, the apparatus has a channel estimator, which is designed to estimate a channel impulse response of a transmission channel on the basis of the received signal and the training sequences. Channel estimators are known in the field of digital signal processing. The apparatus also has a signal reconstructor, which is designed to reconstruct the useful signal using the estimated channel impulse response and the training sequences (or a training symbol), and to obtain a reconstructed signal which represents the useful signal. The apparatus also has a subtractor, which is designed to subtract the useful signal from the received signal, in order to obtain the error signal. The error signal represents the interference contained in the received signal. The error signal is supplied to the processor which uses it as the basis to determine the first and the second variable, with the interference type being determined on the basis of the ratio of the two variables.

According to another embodiment and independently of how the signal on whose basis the first and the second variables are determined is formed, it may be advantageous to determine a mean value over a plurality of ratios, rather than the directly determined ratio, so that the detector determines the signal type on the basis of the mean value of the ratios.

For this purpose, the apparatus according to the invention has an averaging unit, which is designed to carry out an averaging process over a plurality of ratios. The averaging unit is arranged between the system or means for determination of the ratio and the detector. The averaging unit may, for example, be a filter which is designed to carry out low-pass filtering. According to one embodiment, the filter is an IIR filter (IIR=Infinite Impulse Response).

The means for determination of the ratio may also be designed to determine the plurality of ratios on the basis of the previously determined variables, which the processor has determined on the basis of a plurality of previous signals.

According to another embodiment, the present invention provides a signal detector which is designed to detect a useful signal in a received signal and to detect an interference type of an interference signal which is contained in the received signal. The signal detector has a channel estimator which is designed to estimate the channel impulse response of a transmission channel which is arranged between a transmitter and a receiver, on the basis of the received signal and a training symbol. The signal detector also includes the apparatus for detection of the signal type, as has been described above. The signal detector also has a signal reconstructor, which is designed to reconstruct the useful signal as described above on the basis of the estimated channel impulse response.

The expression "useful signal" means that signal which is obtained on convolution of a training sequence (which is not subject to interference) with the channel impulse response. The useful signal thus represents the pure channel interference component without any additive interference such as noise or signal interference.

If a useful signal such as this is subtracted from the received training sequence, then this results in an interference signal which, for example, contains additive interference and other interference components.

In the case of burst transmission, training data (training sequence) is included in a first section of the burst, for example at the start or in the centre of the burst. In contrast, the data is included in a second section of the burst, that is to say following the training data. The useful signal is, according to one embodiment, estimated only on the basis of the training data.

In order to determine the channel interference component (that is to say of the useful signal), the signal reconstructor convolves (for example with the aid of a filter) the training sequence (training symbol) with the channel impulse response, in order to obtain the useful signal. The training sequence in this case corresponds to the training sequence to be transmitted, which is known at the reception end and is stored, for example, in a memory. When the channel interference component obtained in this way is subtracted from the received training sequence (received signal), then this results in the interference signal which, for example, represents co-channel interference and noise.

The signal detector also has a subtractor, which is designed to subtract the reconstructed signal (that is to say the signal to be expected at the channel output without additive interference) from the received signal (for example from the received training sequence) in order to obtain the interference signal. The interference signal is supplied to the apparatus for detection of the signal type, which detects the signal type on the basis of the interference signal.

The interference signal in the burst can be suppressed, on the basis of the knowledge of the interference type, by filtering or by equalization. For this purpose, the signal detector has, for example, a filter which filters the received signal in order to suppress the interference signal. By way of example, the filter may have a variable pass bandwidth, which is dependent on the interference type. If, for example, the interference type indicates that the interference signal is adjacent-channel interference, then the pass bandwidth of the filter is set to the bandwidth of the transmission channel, or is reduced in order to filter out the adjacent-channel interference. The filter output signal can in its own right be regarded as the detected useful signal. According to another embodiment, however, a detector is provided which is connected downstream from the filter and carries out more accurate signal detection.

The present invention also provides an energy estimator, which determines the signal energy on the basis of energy levels in the spectrum elements. The energy estimator has N−1 1/N-band filters, where N is a natural number. The filters are used to filter a signal with a signal bandwidth and to output N−1 processed signals (that is to say filtered signals). Each of the N−1 processed signals thus has a bandwidth which is 1/N-th of the signal bandwidth, where N is greater than unity. According to one embodiment, N=2.

The energy estimator also has a subtractor, which is designed to subtract the N−1 processed signals from the (original) signal in order to obtain an N-th processed signal. The energy estimator also has N calculation means, which are designed to calculate the energy levels of the N processed signals. In this case, each of the processed signals has an associated calculation means.

The N−1 filters are distinguished by having different mid-frequencies, so that the spectrum elements of the processed signals represent different spectral ranges of the spectrum of the filtered signal. The energy levels, as calculated by the calculation means, of the processed signals thus in each case represent the energy levels of the spectrum elements.

In order to obtain the total energy of the signal, the energy estimator may, for example, have an adder which adds up a plurality of calculated energy levels in order to obtain the signal energy.

According to one embodiment, the energy estimator can be designed to superimpose, for example, energy levels of a number of spectrum elements in order to estimate the signal energy. This is particularly advantageous when the signal is subject to adjacent-channel interference. In order to detect the interference type, the channel estimator can, for example, have the apparatus as described above for detection of the signal type. In the case of adjacent-channel interference, the energy estimator can thus access those spectrum elements which do not have any adjacent-channel interference component. This results in the estimate becoming more accurate, because undesired interference is not included in the calculation of the signal energy.

Figure 1B:
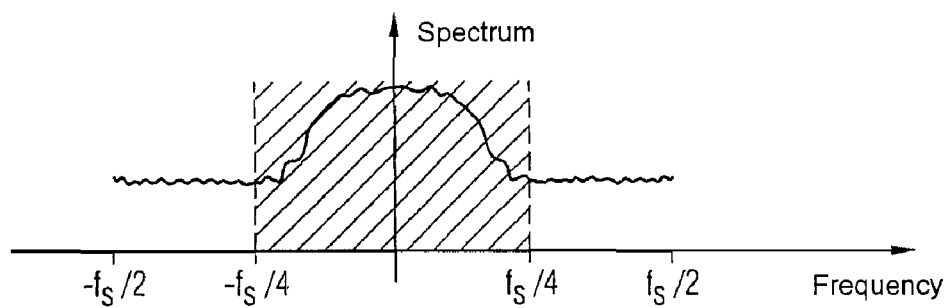
FIG. 1B illustrates a profile of a signal spectrum with co-channel interference.
Figure 1C:
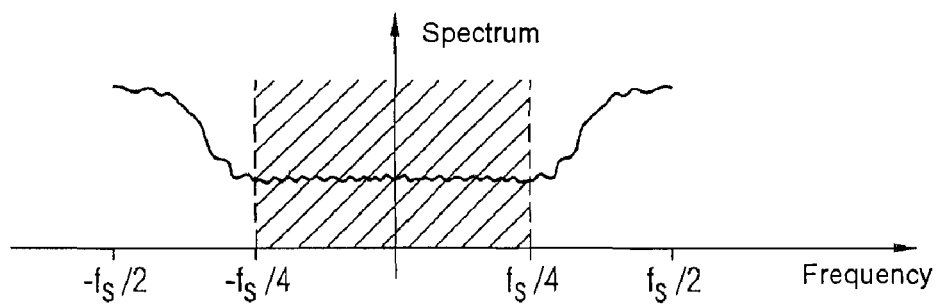
FIG. 1C illustrates a profile of a signal channel with adjacent-channel interference.

The signal whose signal type is to be detected may be an error signal which, for example, is derived from a channel estimate. In this case, the error signal predominantly contains noise and interference disturbances. Depending on what type of interference is dominant, the spectrum of the error signal has, statistically on average, a different typical profile, as is illustrated in FIGS. 1A to 1C. FIG. 1A illustrates the spectrum of an error signal which represents only noise (no interference signal). FIG. 1B illustrates the spectrum of an error signal which represents dominant co-channel interference. FIG. 1C illustrates the spectrum of an error signal which represents dominant adjacent-channel interference. The sampling frequency is in each case $f_s$.

According to one or more embodiments of the invention, the various spectral characteristics, that is to say the signal-type-dependent signal spectra are used for identification of interference. In this case, the spectrum of the error signal is subdivided into two frequency bands, the lower frequency band (the shaded area) and the upper frequency band. The ratio of the energy between the lower and the upper frequency bands $P_L$ and $P_H$, respectively, is used as a measure for detection purposes. If the ratio of the energy is greater than a predefined threshold $t_1$, co-channel interference is detected. If the ratio of the energies is less than a second predefined threshold $t_2 (t_2 < t_1)$, adjacent-channel interference is detected. Otherwise, no interference is detected (noise dominant).

The threshold $t_1$ may, for example, assume values between 5 and 10. The threshold $t_1$ may, however, also be less than 1 and, for example, may assume values between 0.3 and 0.8. According to one embodiment, the lower threshold can assume values between 1000 and 1500, when using an integer notation (16 bits). In this case, by way of example, the upper threshold assumes values between 2500 and 3000. Whether $t_1$ is greater or less than 1 depends on how the ratio of the variables is defined. If, for example, a first variable is related to a second variable which is greater than the first variable, then the threshold is greater than 1. If, in contrast, the second variable is less than the first variable, then the threshold is less than 1.

One possible implementation for estimation of the energy in the lower frequency band and in the upper frequency band is to use the Fourier transforms of the autocorrelation vector in accordance with equations (2) and (3):

$$P_L(m) = \sum_{k=0}^{N-L} |R_{ee}(k, m)|^2 \text{ and } P_H(m) = \sum_{k=N-L+1}^{2(N-L)} |R_{ee}(k, m)|^2 \quad (4)$$

$$c(m) = \frac{P_L(m)}{P_H(m)} \quad (5)$$

In this case, $P_L(m)$ and $P_H(m)$ are the corresponding estimates of the energy in the m-th burst. This form requires complex implementation, since $2*(N-1)+1$ autocorrelation values and their Fourier transforms must be calculated. Approximately $O(8(N-L)^2)$ operations are required for this purpose.

A second, less complex implementation, is to estimate the energy directly from the Fourier transforms of the error signal:

$$E(n, m) = \sum_{k=0}^{N-L} e(k, m) \cdot e^{\frac{-j2\pi kn}{(N-L)+1}} \quad (6)$$

$(n = 0, 1, \ldots N - L)$ $$P_L(m) = \sum_{k=0}^{(N-L-1)/2} |E(k, m)|^2 \text{ and } P_H(m) = \sum_{k=(N-L+1)/2}^{N-L} |E(k, m)|^2 \quad (7)$$

In comparison to the first variant, only the Fourier transforms of the error signal (N−L values) are required in this case (approximately $O(N-L)^2$ operations).

The use of a half-band filter is less complex. The frequency band is subdivided in the time domain:

$$e_L(k, m) = \sum_{i=0}^{L_{HB}} h_{HB}(i) \cdot e(k-i, m) \quad (8)$$

$e_H(k, m) = e(k, m) - e_L(k, m) \quad (k = 0, 1, \ldots N - L)$

In this case, $L_{HB}$ is the filter order and $h_{HB}(i)$, $i=0, 1, \ldots, L_{HB}$, are the filter coefficients. The corresponding energy can be calculated as follows:

$$P_L(m) = \sum_{k=0}^{N-L} |e_L(k, m)|^2 \text{ and } P_H(m) = \sum_{k=0}^{N-L} |e_H(k, m)|^2 \quad (9)$$

The subdivision of the frequency band by half-band filters requires approximately $O(L_{HB}*(N-L))$ operations. A filter order of less than 10 is sufficient for this task, and N−L is generally greater than 20. This means that the third variant requires fewer than half the operations of the second variant. The simplest half-band filter has, for example, only three coefficients (1, 2, 1) and can be implemented particularly easily.

Two modulation methods are used in GSM/EDGE systems: GMSK and 8PSK. GMSK can be described approximately as 8PSK, with the symbol +1 or −1 having been multiplied by a rotation sequence $\exp(jk\pi/2)(j^2=-1)$. They must be rotated back at the receiver end in a corresponding manner using $\exp(-jk\pi/2)$. In the case of 8PSK, eight different complex symbols are possible, the training sequence in this case likewise contains only +1 and −1. The rotation for transmission is carried out using $\exp(jk3\pi/8)$. The derotation is carried out in a corresponding manner using $\exp(-jk3\pi/8)$. The received signal is generally derotated before channel estimation. Derotation correspondingly shifts the spectrum of the received signal. This must be taken into account in the splitting of the frequency band. The coefficients of the half-band filter are generally complex numbers and are different for GMSK-modulated and 8PSK-modulated signals. The coefficients for a second-order half-band filter are in each case as follows: (j, 2, −j) for GMSK modulation and (0.3827+ 0.9239j, 2.0000, 0.3827−0.9239j) for 8PSK modulation.

The spectrum of the current error signal may vary to a major extent from one burst to the next because of multipath propagation. The algorithm described above therefore also has an associated detection uncertainty. Since, however, each interference type has its typical spectral profile, statistically on average, as described schematically as above, the detection confidence can be approved by averaging c(m) over time. The averaging process can be carried out both by an FIR (finite impulse response) filter and by an IIR (infinite impulse response) filter. One embodiment is a recursive filter. A very good result can be achieved even with a simple first-order IIR filter:

$$\tilde{c}(m) = \alpha \cdot c(m) + (1-\alpha) \cdot \tilde{c}(m-1) \quad (10)$$

The averaging process can be controlled directly by the parameter $\alpha$. The smaller $\alpha$ is, the greater is the extent to which it is smoothed. On the other hand, major smoothing leads to the filter having a long stabilization time. An optimum parameter $\alpha$ therefore represents a compromise between these mutually contradictory requirements. In order to reduce the stabilization time, the present invention uses an IIR filter with a switchable coefficient $\alpha$. In this case, after every recess, the process starts with a fast IIR filter with the coefficient $\alpha$hd 0, switching to the IIR filter with the desired coefficient after a predetermined number of bursts $N_0$.

One embodiment is an IIR filter with a plurality of switchable coefficients. In this case, a quite fast IIR filter with $\alpha_0$ is initially used after each recess, switching to a slower IIR filter with $\alpha_1$ after a total of $N_0$ bursts, then switching to an even slower IIR filter with $\alpha_2$ after a further total of $N_1$ bursts, and then finally switching to the desired IIR filter with $\alpha$.

Figure 2:
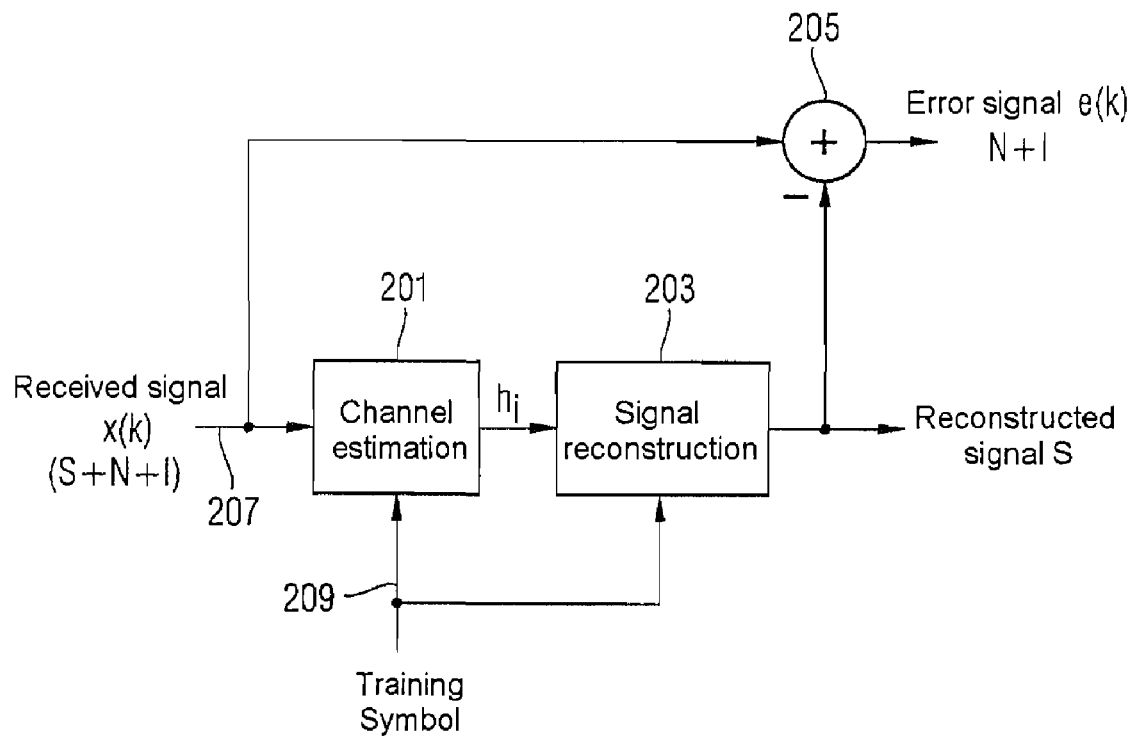
FIG. 2 illustrates a block diagram of a signal estimator.

The advantages of the solution are:
  detection of the various interference situations (noise dominant, co-channel interference dominant or adjacent-channel interference dominant)
  robustness to fluctuations in the cost function over time, by recursive filtering
  short stabilization time by IIR filtering with switchable coefficients
  fewer operations and less memory are required FIG. 2 illustrates a block diagram of a signal detection apparatus which is designed to determine not only a reconstructive signal S but also an error signal e(k), which represents a superimposition of a noise component N and an interference component 1.

The signal detection apparatus (signal detector) has a channel estimator 201, a signal reconstruction device (signal reconstructor) 203 downstream from the channel estimator 201, and a subtractor 205. The elements 201, 203 and 205 are connected as illustrated in FIG. 2.

The channel estimator 201 is designed to receive a received signal x(k) via a first input 207 and a training symbol via a second input 209. The received signal in this case represents the superimposition of a useful signal S, a noise signal N and an interference signal I. The channel estimator 201 is designed to estimate the coefficients $h_i$ of the channel impulse response on the basis of the received signal and of the training symbol, in a manner known per se. The signal reconstructor 203 receives the estimated channel coefficients as well as the training symbol, and uses the estimated coefficients and the known training symbol to reconstruct the signal S. The difference between the received signal and the reconstructed signal, as determined by the subtractor 205, gives the error signal e(k). The energy levels in the reconstructed signal and in the error signal may, for example, be calculated as described above from the sum of the squares of the magnitudes of the respective signal.

The signal detector illustrated in FIG. 2 may, according to one embodiment, be a component of the apparatus according to the invention for detection of a signal type. The apparatus has a processor which is connected downstream from the subtractor 205 and determines the first and the second variable, a means for determination of the ratio between the first variable and the second variable, as well as a detector which is designed to deduce the signal type on the basis of the ratio. In the case of the error signal e(k), the signal type is an interference type, for example co-channel interference or adjacent-channel interference.

According to another embodiment, the apparatus according to the invention for detection of a signal type may be connected downstream from the subtractor 205 illustrated in FIG. 2.

Figure 3:
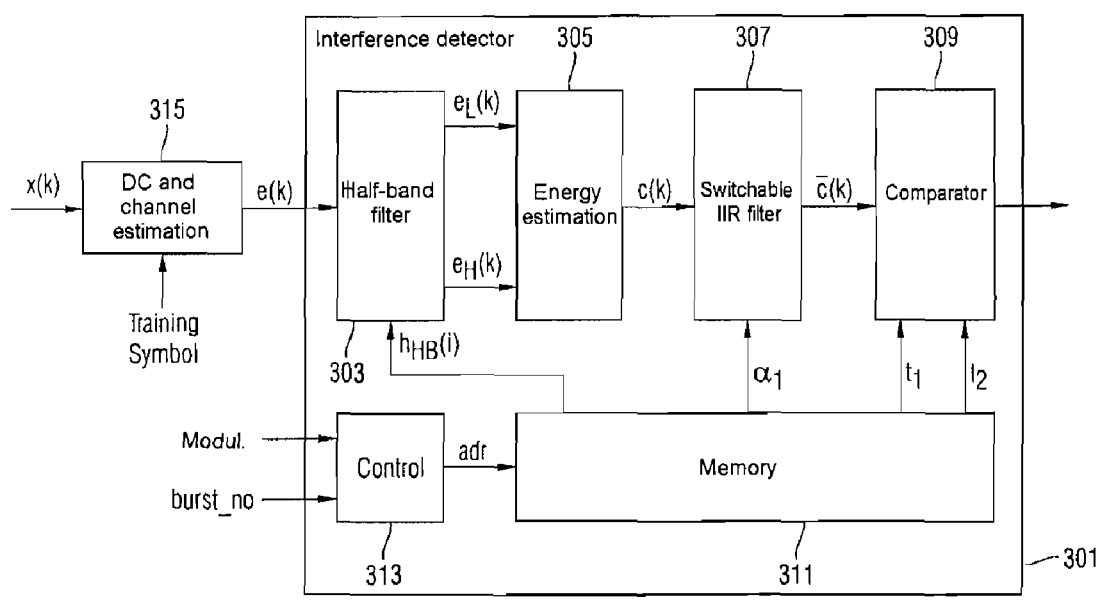
FIG. 3 illustrates a block diagram of an apparatus for detection of a signal type according to one exemplary embodiment of the invention.
Figure 4:
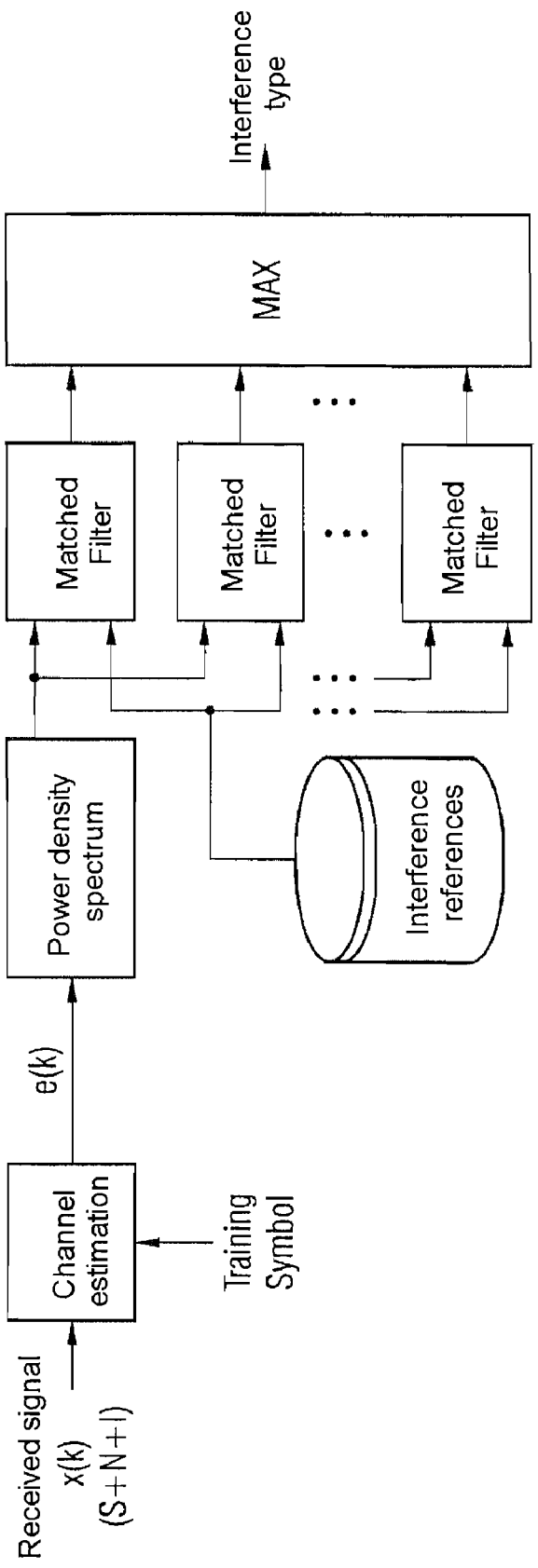
FIG. 4 illustrates a block diagram of a known interference identification apparatus.
Figure 5:
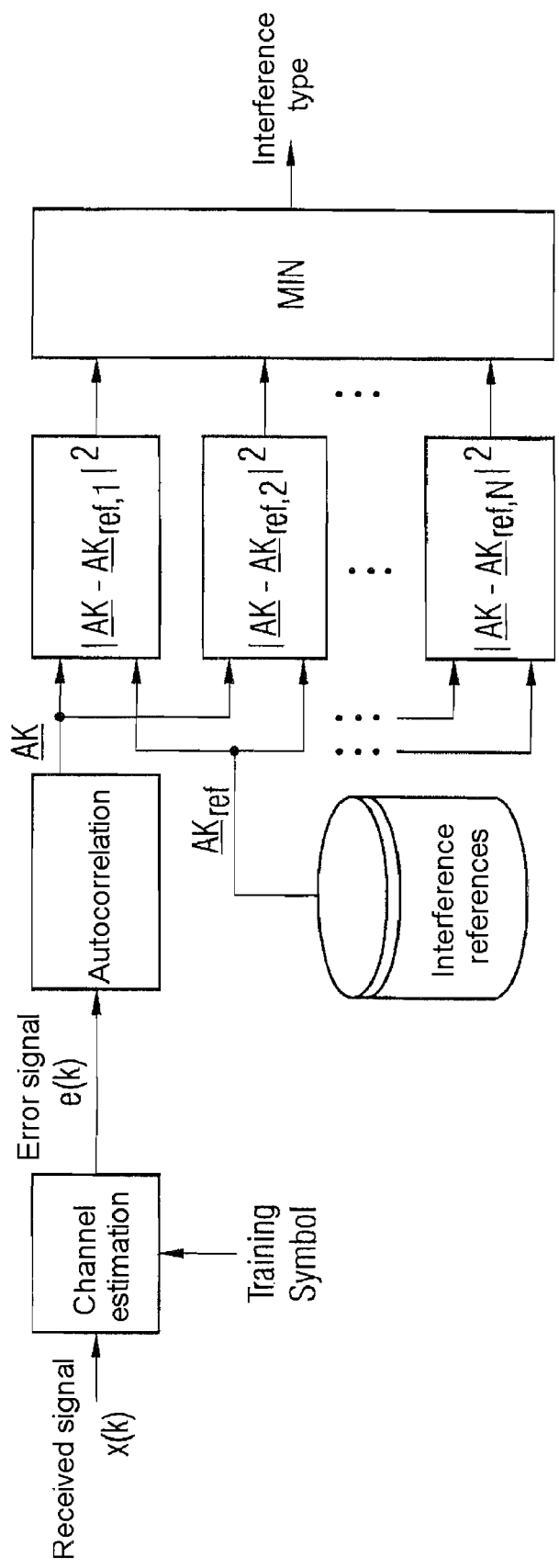
FIG. 5 illustrates a block diagram of a known interference identification apparatus.

FIG. 3 illustrates one exemplary embodiment of an apparatus according to the invention for detection of a signal type (interference detector). The interference detector 301 has a half-band filter 303, an energy estimator 305 connected downstream from the half-band filter 303, a switchable IIR filter 307 connected downstream from the energy estimator 305, and a comparator 309 connected downstream from the filter 307. The interference detector 301 also has a memory 311, whose outputs are respectively connected to the half-band filter 303, to the IIR filter 307 and to the comparator 309. The interference detector 301 also has a control unit 313 (controller), whose output is connected to one input of the memory 311.

As illustrated in FIG. 3, the interference detector 301 may be connected downstream from a channel estimator 315 (which can also carry out DC estimation). The channel estimator 315 carries out a channel estimation process on the basis of a received signal x(k) as well as a training symbol, and determines an error signal e(k), which is supplied to the half-band filter 303.

The error signal e(k) determined by the DC and channel estimator 315 is supplied to the half-band filter 303, which carries out the half-band filtering and supplies two processed signals $e_f(k)$ and $e_H(k)$ to the energy estimator 305. The energy estimator 305 (which, for example, is in the form of a processor) determines the first and the second variable on the basis of the output signals from the half-band filter 303. In the exemplary embodiment illustrated in FIG. 3, the variables mentioned above are energy levels, whose ratio c(k) is supplied to the switchable IIR filter 307. The ratio c(k) can be determined by the energy estimator 305. For this purpose, the energy estimator 305 may also have the means already described above for determination of the ratio, which means form the ratio between the signals emitted from the half-band filter.

The switchable IIR filter 307 is designed to determine a mean value of the ratios c(k) and to supply the mean value to the comparator 309. The comparator 309 compares the mean value of the ratios with the thresholds $t_1$ and $t_2$, and uses this comparison as the basis to decide the type of interference. A signal which indicates the interference type is emitted at the output of the comparator 309.

The coefficients $h_{HB}(i)$ of the half-band filter 303 are obtained from the memory 311. The memory 311 also supplies the coefficients $\alpha_1$ to the IIR filter 307, and the thresholds $t_1$ and $t_2$ to the comparator 309. The comparator 309 corresponds to the detector described above, and is designed to detect the signal type on the basis of the ratio.

The control unit 313 receives the control signals "modul" (modulation type) as well as "Burst_No" (number of bursts) and produces an address signal ADR, which controls the memory 311.

The interference detector illustrated in FIG. 3 may, for example, be used in a GSM/EDGE receiver for equalization of a received signal which has been distorted by noise, co-channel and adjacent-channel interference sources, as well as multipath propagation. In this case, first of all, the error signal which has determined in the channel estimation process and which predominantly contains only information relating to interference is subdivided into two frequency bands. The aim is for one frequency band to contain mainly the energy of the co-channel interference source, and for the other frequency band to contain the energy of the adjacent-channel interference source. The noise energy is approximately the same in both frequency bands. Furthermore, the energy ratio provides information as to whether co-channel or adjacent-channel interference sources, or no interference sources, are present. The downstream equalizer can then use this information for equalization of the signal by the respective optimum algorithm for this reception situation.

In order to improve the detection robustness, the energy ratio is filtered by a first-order recursive filter. The IIR filter coefficient is switchable as a function of the state of the burst counter, in order to shorten the filter stabilization time.

In one embodiment, the required filter coefficients and threshold values are stored in ROM or in RAM. The control unit reads the appropriate filter coefficients for the half-band filter or the IIR filter from the memory, depending on the modulation type and the state of the burst counter. The necessary operations are carried out in dedicated hardware or on a DSP.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system having a signal processor for detection of a signal type of a signal which has a signal-type-dependent signal spectrum comprising:

a processor which is designed to determine a first variable which is characteristic of a first spectrum element of the signal spectrum, and to determine a second variable which is characteristic of a second spectrum element of the signal spectrum;

a system configured to determine a ratio between the first variable and the second variable;

a detector configured to detect the signal type on the basis of the ratio:

the detector being designed to compare the ratio with a threshold value in order to detect the signal type: and the detector being designed to detect a first signal type when the ratio is greater than the threshold value, to detect a second signal type when the ratio is less than a further threshold value, and to detect noise in other cases.

2. The system according to claim 1, comprising the first variable being the energy in the first spectrum element, and the second variable being the energy in the second spectrum element.

3. The system according to claim 1, comprising the system for determination of the ratio having a divider.

4. The system according to claim 1, comprising the processor being designed to carry out a Fourier transformation on the signal and to determine the first and the second variable on the basis of the Fourier transforms of the signal.

5. The system according to claim 1, comprising the processor being designed to filter the signal, to obtain a first signal component which has the first spectrum element, to subtract the first signal component from the signal, to obtain a second signal component, to determine a first variable on the basis of the first signal component, and to determine the second variable on the basis of the second signal component.

6. The system according to claim 5, comprising the processor having a half-band filter for filtering of the signal to obtain the first signal component.

7. A system having a signal processor for detection of a signal type of a signal which has a signal-type-dependent signal spectrum comprising:

a processor which is designed to determine a first variable which is characteristic of a first spectrum element of the signal spectrum, and to determine a second variable which is characteristic of a second spectrum element of the signal spectrum;

a system configured to determine a ratio between the first variable and the second variable;

a detector configured to detect the signal type on the basis of the ratio;

the processor being designed to filter the signal, using a half-band filter, to obtain a first signal component which has the first spectrum element, to subtract the first signal component from the signal, to obtain a second signal component, to determine a first variable on the basis of the first signal component, and to determine the second variable on the basis of the second signal component; and the signal spectrum having a spectral shift as a result of a derotation sequence which is used at the receiving end, and the transfer function of the half-band filter having the spectral shift in order to take account of the effect of the derotation sequence.

8. The system according to claim 1, comprising the signal being the difference between a received signal and a useful signal which is contained in the received signal, and the signal type indicating an interference type.

9. The system according to claim 8, comprising the interference type being adjacent-channel interference, co-channel interference or noise.

10. The system according to claim 8, comprising:

a channel estimator for estimation of the channel impulse response of a transmission channel using the received signal and a training symbol;

a signal reconstructor for reconstruction of the useful signal using the channel impulse response and the training symbol, in order to obtain the useful signal; and a subtractor for subtraction of the useful signal from the received signal, in order to obtain an error signal.

11. The system according to claim 1, comprising an averaging unit, which is arranged between the system for determination of the ratio and the detector, with the averaging unit being designed to form a mean value over a plurality of ratios, with the detector being designed to detect the signal type on the basis of the mean value.

* * * * *